Sept. 7, 1965  SUSUMU OTSUKI ETAL  3,205,047
VESSEL FOR SALTING OUT CRYSTALLINE AMMONIUM CHLORIDE
Filed Sept. 7, 1960
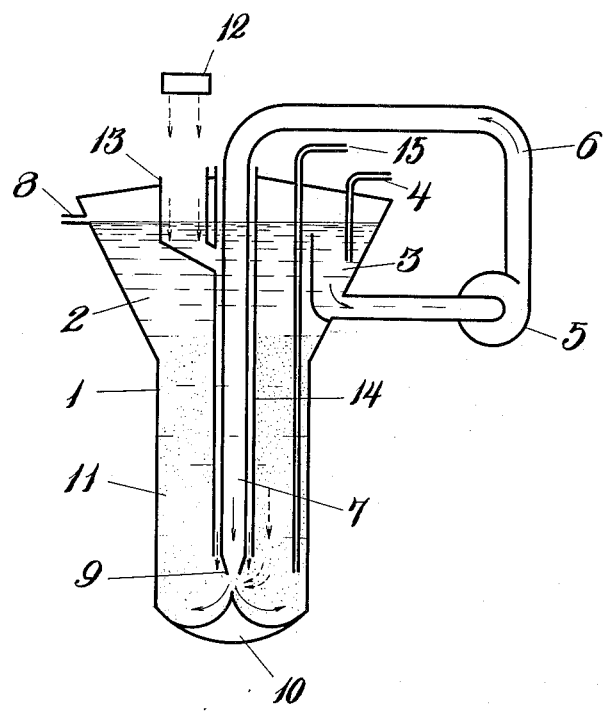
INVENTORS:
SUSUMU OTUKI
BY YASUHITO SAEKI
HIDEICHI WAKASA

3,205,047
VESSEL FOR SALTING OUT CRYSTALLINE AMMONIUM CHLORIDE

Susumu Otsuki, 3049, 1 Oaza-Tonda, Nanyo-cho, Tuno-gun, Yamaguchi-ken, Japan; Yasuhito Saeki, 2018 Oaza-Shimokami, Tokuyama-shi, Yamaguchi-ken, Japan; and Hideichi Wakasa, 2591 Oaza-Tonda, Nanyo-cho, Tuno-gun, Yamaguchi-ken, Japan
Filed Sept. 7, 1960, Ser. No. 54,451
Claims priority, application Japan, Sept. 9, 1959, 34/28,807
1 Claim. (Cl. 23—273)

The invention relates generally to an apparatus for the production of crystalline ammonium chloride. It concerns more specifically with an apparatus for supplying, distributing and dissolving common salt and involves a crystallizer vessel for salting-out crystalline ammonium chloride of relatively larger sizes in such way that in ammonium chloride mother liquor is added with common salt of solid form.

It has hitherto long been known, that sodiumbicarbonate-separated mother liquor from the ammonia-soda process is cooled after addition of common salt to separate crystalline ammonium chloride from the said solution. This process has been recently employed in practice in a relatively wide range and the thus obtained crystalline products have used in the field of fertilizers and the like.

It is commonly known to those skilled in the art that the products obtainable by such kind of process are of extremely fine size. Such fine crystals are, however, liable to solidify upon absorbing aqueous moisture from ambient atmosphere, so that such process is left much to be desired.

Various attempts have, therefore, been made to overcome such drawbacks and disadvantages inherent to the known technique and to acquire larger size crystalline ammonium chloride. Successful and satisfying attainments and results have, however, not yet been realized, in spite of every effort exerted by those skilled in the art.

Various attempts have therefore been directed to improve crystallizer vessels for the continuous production of crystalline ammonium chloride in the form of large particles through salting-out. For this purpose, it is the most important requirement that the supersaturated state of the treating liquid, which plays naturally a decisive role upon the development of crystals of ammonium chloride, is kept constant and uniform as possible throughout the whole interior liquid phase space of the vessel in the course of operation. In order to fulfill these requirements, the dissolving of the added common salt, which induces the above mentioned super-saturation, should be carefully controlled so as to obtain contant and uniform dissolving of the salt as possible, again throughout the crystallizer vessel in the course of time.

On the other hand, the particle size of the added common salt, which decidedly affects the desired dissolving of the salt, and the degree of unsaturation thereof in the circulating liquid through the crystallizer vessel, depends after all upon the degree of distribution of the common salt within the vessel. In other words, since the degree of unsaturation of the salt depends upon the local density thereof, it is a requisite condition for realization of a uniform distribution of such unsaturation for the purpose of obtaining the desired even and uniform solution of the solute overall the crystallizer, to realize an even distribution of the added common salt.

In consideration of the above mentioned relationship, we have carried out a number of experiments to investigate how to distribute constantly and evenly the common salt in the treating ammonium chloride solution consisting originally of sodiumbicarbonate-separated mother liquid obtained from the ammonia-soda process and added with ammonia adapted for being utilized in salting-out crystalline ammonium chloride and found that according to the present invention the desired larger size crystals in comparison with those obtainable by the conventional technique can be definitely and constantly produced in a continuous process and under accurately controlled conditions.

The preferable crystallizer vessel adapted for carrying out the process according to this invention is preferably shaped in an inverted cone, or in a cylinder provided at its top end with an inverted frusto-conical enlarged portion, thus obtaining in the region of such enlarged upper end a supernatant liquid containing substantially none of fine particles. This liquid is then added with a suitable quantity of bicarbonate-separated mother liquor from the ammonia-soda process in order to re-circulate it through the vessel after preliminary regulation of the unsaturation degree of the natrium chloride content thereof to a predetermined constant value. Thus, the sodium-bicarbonate-separated mother liquor, which is, as commonly known to those skilled in the art, having an appreciable degree of unsaturation with common salt is not directly supplied to the crystallizer, but supplied only after a controlled preliminary adjustment of the salt-unsaturation degree within such predetermined limits in dependence upon the quantity of the added common salt carried into the crystallizer by the re-circulating mother liquor separated ammonium chloride crystals therefrom, said mother liquor being naturally saturated with common salt, thereby controlling the supersaturation degree of the treating liquid prevailing within the crystallizer to a predetermined limited range enough to suppress the possible development of undesired finer crystalline particles.

The main object of the invention is to provide a process of the nature as above referred to, wherein the common salt is direct-added to the crystallizer vessel in its solid form and distributed therein highly in its even state during an extended period of continuous operation, thereby to realize a constant and even state of supersaturation with the main solute or ammonium chloride over the whole period of operation.

In order to fulfill the above mentioned main object, it is first necessary to make the flow within the vessel uniform as possible to distribute the added solid salt therein. For this purpose, the re-circulating liquid is supplied internally and centrally to the vessel, instead of externally, by such a way that an inner supply tube, having a proper nozzle diameter for providing a suitable flow rate of re-circulating liquid, in cooperation of the capacity of the re-circulating pump, is arranged along the longitudinal axis of said vessel so as to open in the neighborhood of the bottom thereof and a cone-shaped diffuser is fixedly mounted on said bottom and in an opposite arrangement to the nozzle opening of said inner supply tube. In this way, the desired even flow of the re-circulating liquid can be effectively attained.

On the other hand, the solid common salt is charged through a separate supply tube, which is, however, arranged concentrically to the above mentioned inner tube, and outwardly thereof, into the vessel, and then carried by the recirculating liquid in a mixed state. In this way, the supplied salt can be directed at first centrally and then radially and upwardly in an even way, thanks to the symmetrical construction of the double-tube supply system. The thus radially directed mixture is led at the same time upwardly of the vessel in a relatively slow speed flow by the forced recirculation provided by a circulating pump and thanks to the cone-shaped configuration of the diffuser.

It is a common practice in chemical plants employing centrally arranged double-tube supply means, the inner tube is normally formed with an enlarged outlet end, for instance as in the case of the conventional cooling vessels, evaporative crystallizer vessels and the like. If such system is employed in a salting-out vessel as in the case of the present invention, and when the common salt is supplied through the outer tube, troubles would frequently be encountered from depositing and accumulating of the salt on the enlarged end of such inner tube, resulting in uneven mixing of the salt with the re-circulating liquid, which means that the desired even distribution of the salt is considerably disturbed. On the other hand, it is highly desirable, that in the crystallizer vessel, the both kinds of particles, ammonium chloride and common salt, are carried by the flowing liquid in an intimately contacting relation as possible with each other and in a dense condition. With too high speed of the upwardly directing re-circulating liquid, the above mentioned ideal state would be broken, thus there being a limit in this respect. In consideration of these conditions, and in order to obtain a uniform flow within the vessel, the opening end of the inner tube of the supply system in this invention is restricted in its shape to thereby provide a kind of nozzle, thus increasing the flow rate in this region, while in cooperation of said nozzle with the aforementioned diffuser mounted centrally on the bottom of the vessel, an even and distributed flow of the salt and the transfer thereof to the wall surface of the vessel are assured without difficulty.

Since the liquid flow within the crystallizer vessel is directed upwardly, it is advantageous to arrange the opening end of the outer tube designated for supply of the added common salt nearer to the bottom of the vessel. However, too near positioning of the outlet opening to the bottom than required, will disturb the flow of the developed crystalline particles, so that its position should be selected at least above the lower opening end of the inner supply tube. On the contrary, it was found that a too high position of the lower opening end of the salt-supplying outer tube will let the salt particles consume disadvantageously longer time until they have been distributedly carried by the re-circulating liquid, which results in turn in an uneven distribution of the salt, as well as in developing undesired fine crystalline particles.

It may be possibly concluded, that the real reasons of these phenomena are attributable to the suctioning effect provided by the jet stream in the neighborhood of the opening end of the inner liquid supply tube and that in and above the level of the nozzle end the slurry containing, both the developed crystalline particles and common salt is directed back to the nozzle under the influence of the said suctioning effect.

Profound experiments were carried out by us to investigate the optimum position of the outlet opening end of salt-supplying outer tube relative to the nozzle end of the cooperating inner liquid supply tube, and we found, indeed, that the salt can be distributed throughout the liquid in the most effective manner, when a line passing through these both open ends makes an angle ranging between 0–60 degrees with the horizontal line.

It is naturally required that the common salt after being supplied can drop through the outer tube without any hinderance, in order to insure an uninterrupted and even supply of the salt into the crystallizer vessel. In order to fulfill this requirement, a semi-submerged type hopper is provided at the upper end of the outer tube, in order to thereby supply the common salt always through the thus formed liquid column. On the contrary, if the hopper is mounted above the liquid level, clogging of the supply tube with the salt may frequently occur, which, if happens to take place, will interfere with the desired continuous operation of the plant. In order to avoid such difficulty with the conventional arrangement, the salt supply tube would have to be constructed much larger in its cross-section than is necessary for the inventive arrangement according to this invention, if the aforementioned clogging must be completely avoided and a smooth and continuous supply of common salt must be insured.

With the novel arrangement as above explained, however, the common salt supplied to the semi-submerged hopper will drop through the liquid column contained in the outer supply tube and comprising a saturated liquid with common salt, smoothly and effectively in a continuous manner under the influence of the gravity action to the bottom opening end of said tube, thence discharged in its solid form, into the interior of the crystallizer vessel in a constantly and evenly distributed manner under the influence of the jet stream issuing out the nozzle opening of the inner liquid supply tube and in an intimate cooperation of said diffuser.

Within the semi-submerged hopper, there is always present a body of liquid saturated with common salt, so that further dissolving of the newly supplied common salt can not take place in this region at all, thus any development of fine crystalline particles of ammonium chloride therein being absolutely avoided. In addition, the common salt is supplied from the outer tube only it its solid state and distributed evenly in this state throughout the interior of the treating vessel, so that the state of supersaturated condition with ammonium chloride in the liquid prevailing therein can be constantly and perfectly controlled by an operator.

Various further and more specific objects, features and advantages of the invention will appear from the description given below, taken in connection with the accompanying drawing, as well as in the form of an example, said drawing, however, illustrating only by way of example a preferred embodiment of the apparatus adapted for carrying out the process according to this invention.

Now referring to the accompanying drawing, the re-circulating liquid consisting of ammonium chloride-separating mother liquor added with common salt for salting-out and prevailing within a crystallizer vessel as shown is considerably reduced in its upflowing speed at the enlarged upper end 1 of said vessel, said end being as shown and described hereinbefore as of inverted frusto-conical shape, and turned into a substantially clear supernatant solution 2 practically free of fine common salt and ammonium chloride particles suspended therein. The clear liquid 2 transfers to the region of a bell-mouth 3 formed in the upper corner of the interior of the treating vessel. In the bell-mouth 3, a charge pipe 4 opens for supply of sodium-bicarbonate-separated mother liquor from an ammonium-soda processing stage, not shown, thereby the re-circulating liquid being adjusted in the sense of salt-unsaturation degree as required to a predetermined level. The thus adjusted mixture is then conveyed through a pressure pump 5 and a re-circulating piping 6 to the upper end of a liquid-supplying inner tube 7, which cooperates, with a salt-supplying outer tube 14 mounted concentrically and outwardly thereof, thus forming a double-tube type supply system arranged centrally of the vessel.

A portion of the supernatant liquid 2, in correspondence to the newly supplied quantity of the sodium-bicarbonate-separated mother liquor from supply pipe 4, is discharged in an overflow through a discharge pipe 8 leaving from the vessel.

Meanwhile, the re-circulating liquid, which has been adjusted as to the salt-unsaturation degree in the manner as above explained, is discharged through the lower open end shaped in the form of a nozzle 9, into the interior of the vessel in the form of jet stream towards the centre of bottom of the vessel.

The thus discharged liquid stream is evenly distributed radially of the vessel upon striking against a diffuser 10, which is mounted in opposition to nozzle 9 and on the bottom of the vessel. The ammonium chloride particles in crystalline form thus developed in the neighborhood of nozzle 9 are conveyed by the radially and upwardly flowing fluid on to the relatively lower portion of the cylindrical wall surface of the vessel, thus forming a moving crystalline layer 11 on the inner wall surface. On the other hand, common salt is charged by means of a table feeder 12 into a semi-submerged hopper 13 mounted on the upper end of outer tube 14, said charging being carried out in correspondence to the supplied bicarbonate-separated mother liquor. The thus supplied common salt drops then through the saturated liquid column within the outer tube 14 by gravity and discharged from the lower open end thereof towards the centre of bottom of the vessel. The discharged salt in its solid state is conveyed by the above mentioned crystal-carrying flow of liquid and thus distributed evenly throughout the interior of the vessel. For taking-out the developed crystalline particles, a discharge pipe 15 is arranged as shown.

EXAMPLE

A re-circulating liquid of the kind as referred to hereinbefore, about 850 cubic meters per hour, is supplied from a nozzle, having an opening diameter of 230 millimeters, of an inner tube, of 600 millimeters O.D., into the interior of a crystallizer vessel as shown, having an upper diameter of 7.5 meters, a lower diameter of 5.0 meters and a height of 10.0 meters. The vessel is provided as in the manner described hereinbefore, with a semi-submerged type hopper, a diffuser and a salt-supplying outer tube of 950 millimeters. The construction is so designed, that the line passing through the both open ends of said outer and inner supply tubes makes and angle of 30 degrees with the horizontal plane. On the other hand, sodium-bicarbonate-separated mother liquor through a supply pipe and common salt from said hopper through the outer tube are supplied, respectively, in quantities corresponding to a production rate of 1 ton products per hour, into the interior of the vessel for salting-out crystalline ammonium chloride. In this way, the crystalline chloride can be produced without trouble for a long period of time. Mean particle size distribution of the crystalline products produced in a continuous running of the plant as long as three months is tabulated hereinbelow.

| Mesh: | Percent |
|---|---|
| 8 | 1 |
| 8–10 | 22 |
| 10–12 | 10 |
| 12–16 | 34 |
| 16–20 | 17 |
| 20+ | 16 |

Although a certain embodiment of the apparatus for carrying out the process according to this invention, as well as a specific example thereof, have been herein disclosed for purposes of explanation, further modifications thereof, after study of this specification, will be apparent to those skilled in the art to which the invention pertains. Reference should accordingly be had to the appended claim in determining the scope of the invention.

What is claimed as new and desired to be secured by Letters Patent of United States is:

An apparatus for crystallizing ammonium chloride from a solution of same in a mother liquor by salting out with soduim chloride which comprises, in combination, a crystallizing vessel having an upper and a lower portion, said upper portion being substantially in the form of an inverted truncated cone, said lower portion being substantially of cylindrical shape and of substantially less diameter than that of the top of said inverted conical portion, a baffle in said upper portion defining a restricted communicating zone thereof, a first supply conduit for fresh liquor extending into said restricted zone, a second conduit arranged to withdraw liquor from said restricted zone mingled with liquor already present therein which is poor in ammonium chloride, and deliver the same vertically downward and centrally of said vessel to a point adjacent the bottom thereof, a pump in said second conduit, a hopper disposed in said upper portion so as to receive a supply of sodium chloride crystals and extending from above to beneath the normal liquid level in said vessel, said hopper being confined from the liquor in said upper portion, a third conduit which leads from said hopper downwardly in said vessel, an ejector formed by the ends of said second and third conduits adjacent the bottom of said vessel such that the pumped solid sodium chloride in said second conduit acts to eject the liquor from the third conduit, a diffusing baffle disposed below said ejector so as to receive the effluent therefrom and direct it upwardly in said vessel, an overflow outlet from said upper portion spaced from said baffle therein, and means for removing salted-out crystals of ammonium chloride from said vessel.

References Cited by the Examiner

UNITED STATES PATENTS

| 2,439,547 | 4/48 | Otto | 23—273 |
| 2,567,968 | 9/51 | Saeman | 23—302 |
| 2,671,713 | 3/54 | Miller | 23—65 |
| 2,966,394 | 12/60 | Van Ackerman | 23—273 |

NORMAN YUDKOFF, *Primary Examiner.*

MAURICE A. BRINDISI, *Examiner.*